(No Model.) 4 Sheets—Sheet 1.

H. H. ROCKWELL, C. F. GERLACH & E. GEBEL.
CUT-OFF AND POINTING MACHINE.

No. 565,090. Patented Aug. 4, 1896.

(No Model.) 4 Sheets—Sheet 2.

H. H. ROCKWELL, C. F. GERLACH & E. GEBEL.
CUT-OFF AND POINTING MACHINE.

No. 565,090. Patented Aug. 4, 1896.

Witnesses:
Geo. W. Young
Chas. L. Goss

Inventors:
Henry H. Rockwell,
Charles F. Gerlach,
Ernst Gebel,
By Wirkler, Flanders, Smith, Bothsen & Shaw
Attorneys.

(No Model.) 4 Sheets—Sheet 4.
H. H. ROCKWELL, C. F. GERLACH & E. GEBEL.
CUT-OFF AND POINTING MACHINE.

No. 565,090. Patented Aug. 4, 1896.

Witnesses:
Geo. W. Young.
Chas. L. Goss.

Inventors:
Henry H. Rockwell
Charles F. Gerlach
Ernst Gebel

UNITED STATES PATENT OFFICE.

HENRY H. ROCKWELL, CHARLES F. GERLACH, AND ERNST GEBEL, OF MILWAUKEE, WISCONSIN, ASSIGNORS TO THE ROCKWELL MANUFACTURING COMPANY, OF WISCONSIN.

CUT-OFF AND POINTING MACHINE.

SPECIFICATION forming part of Letters Patent No. 565,090, dated August 4, 1896.

Application filed January 3, 1895. Serial No. 533,765. (No model.)

*To all whom it may concern:*

Be it known that we, HENRY H. ROCKWELL, CHARLES F. GERLACH, and ERNST GEBEL, of Milwaukee, in the county of Milwaukee and State of Wisconsin, have invented certain new and useful Improvements in Cut-Off and Pointing Machines; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of our invention is to cut off to desired lengths and simultaneously point or bevel the ends of dowel-pins or similar articles.

It consists of certain novel features in the construction and arrangement of component parts of the machine, as hereinafter particularly described, and pointed out in the claims.

In the accompanying drawings like letters designate the same parts in the several figures.

Figure 1:
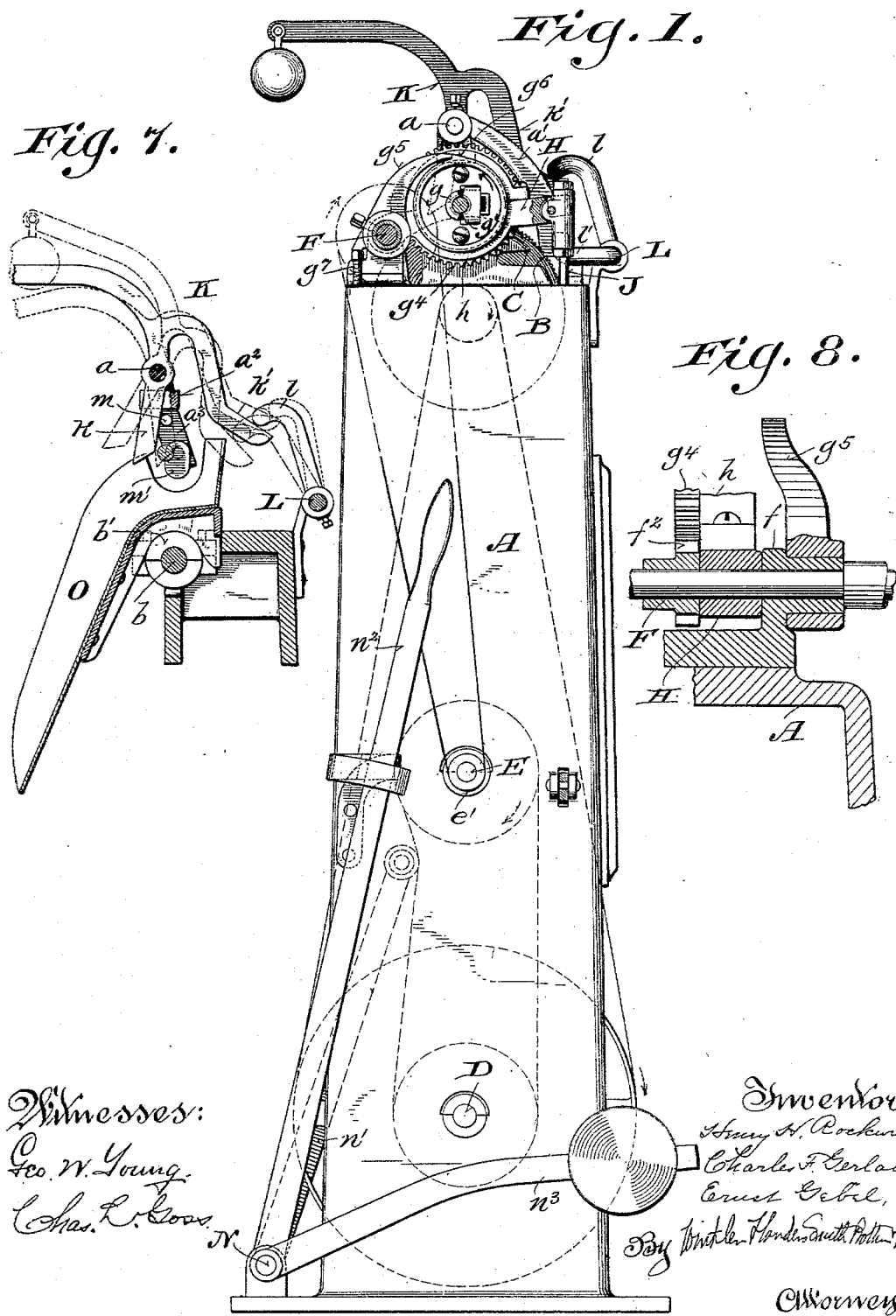
Figure 2:
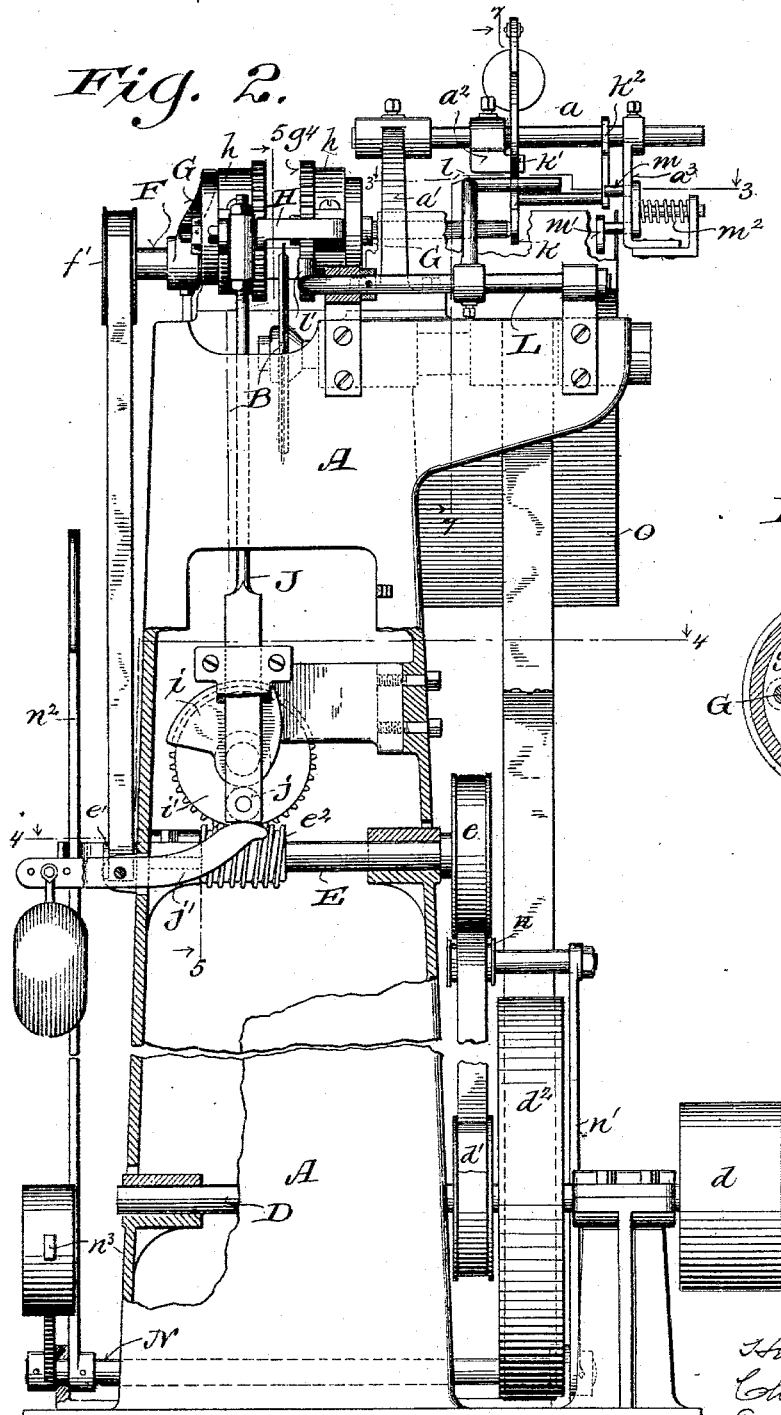
Figure 9:
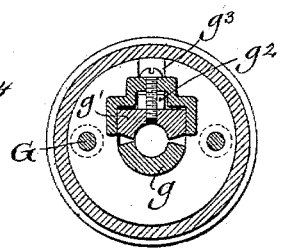
Figure 3:
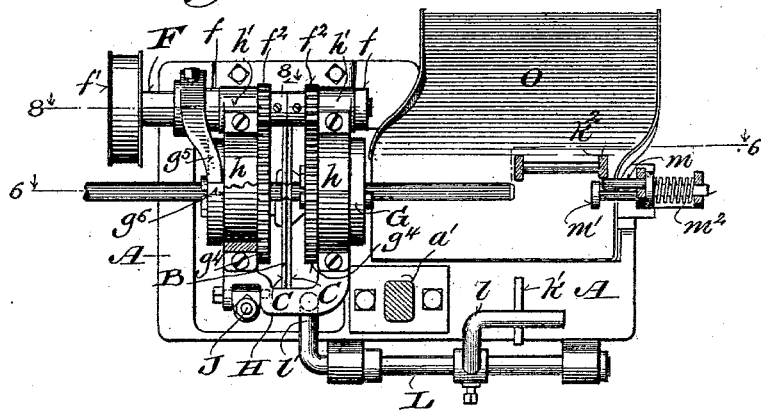
Figure 4:
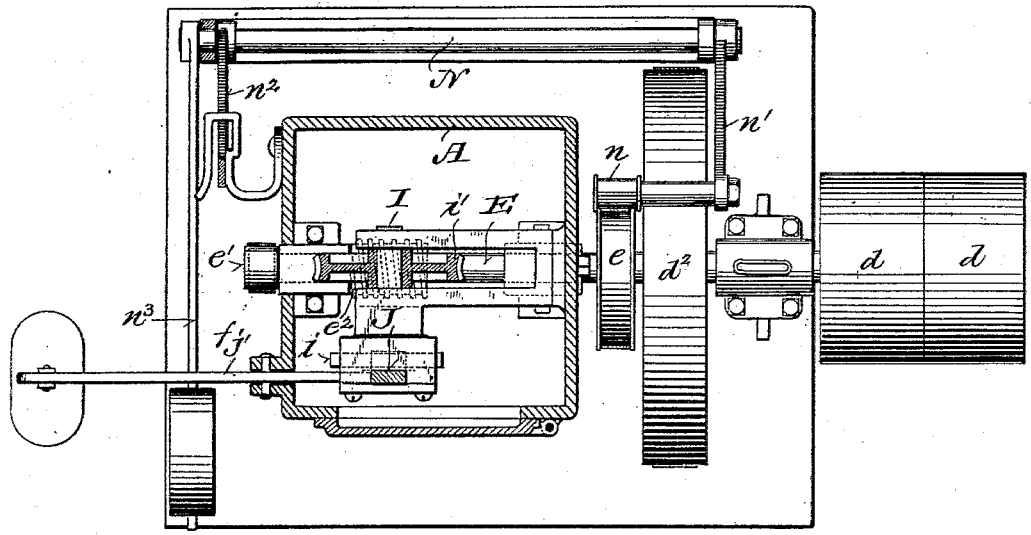
Figure 6:
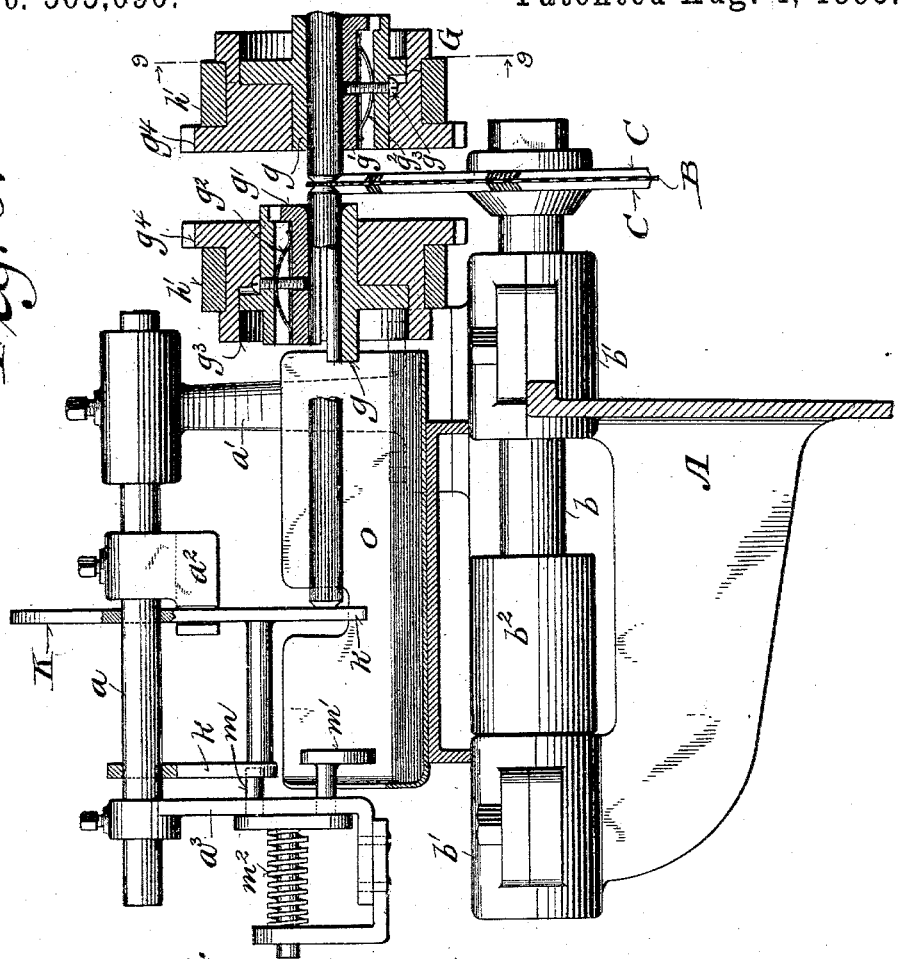
Figure 5:
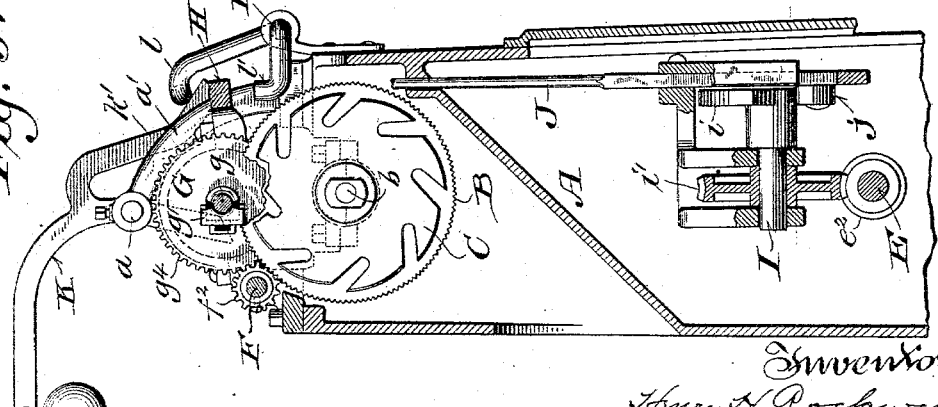

Figure 1 is a front elevation of our improved machine. Fig. 2 is a side elevation thereof viewed from the right with reference to Fig. 1. Fig. 3 is a plan view and partial horizontal section on the line 3 3, Fig. 2. Fig. 4 is a horizontal section on the line 4 4, Fig. 2. Fig. 5 is a vertical section on the line 5 5, Fig. 2. Fig. 6 is an enlarged view, partly in side elevation and partly in vertical section, on the line 6 6, Fig. 3; and Figs. 7, 8, and 9 are sectional views of details of the machine.

A designates the frame.

B is a saw mounted upon one end of a horizontal arbor $b$, which is supported in boxes $b'\,b'$, provided therefor on the top of the frame.

C C are pointing-cutters mounted upon the saw-arbor $b$ next to the faces of the saw, and having cutting edges inclined thereto at a short distance from the periphery of the saw, as clearly shown in Figs. 5 and 6.

D is a counter-shaft supported parallel with the saw-arbor in the lower part of frame A, and provided with tight and loose pulleys $d\,d$, which are designed to be connected by a belt with a pulley on any conveniently-located driving-shaft. It is also provided with a flanged pulley $d'$ and with a pulley $d^2$, which is connected by a belt with a pulley $b^2$ on the saw-arbor.

E is a counter-shaft supported in suitable bearings in the frame A between and parallel with the saw-arbor $b$ and shaft D. It is provided at one end with a flanged pulley $e$, which is loosely connected by a belt with the pulley $d'$, and has at the opposite end a pulley $e'$, and at an intermediate point within the frame a worm $e^2$.

F is a shaft supported in suitable bearings $f\,f$ on top of frame A parallel with the saw-arbor $b$. It is provided at one end with a flanged pulley $f'$, which is connected by a belt with the pulley $e'$, and is furnished between said bearings with a pair of pinions $f^2\,f^2$.

G G are a pair of rotary chucks revolubly held in boxes $h\,h$ of a U-shaped frame H, which is formed at the ends with collars $h'\,h'$, mounted and adapted to turn upon the shaft F between its bearings $f$ and the pinions $f^2$. Each of the chucks comprises a relatively fixed semicylindrical jaw $g$ and an opposing yielding jaw $g'$, pressed toward it by a spring $g^2$ and adjustably held in place by a screw $g^3$, as shown in Fig. 6. Both chucks are concentrically formed or provided with gears $g^4\,g^4$, which mesh with the pinions $f^2\,f^2$.

I is a shaft supported horizontally above and transversely to the shaft E. It is provided with a cam $i$ and a worm-gear $i'$, which engages with the worm $e^2$ on shaft E. A vertically-movable rod J, pivoted at its upper end to the chuck-frame H, is guided at its lower end in a suitable bearing and is provided on one side with a friction-roller $j$, which is engaged by the periphery of the cam $i$. A weighted lever $j'$, fulcrumed to the frame of the machine and bearing at or near one end against the lower end of said rod, holds said friction-roller upwardly against the periphery of the cam, and tends to swing and hold the chuck-frame H upwardly as far as the cam $i$ will permit.

$g^5$ is an adjustable stop mounted, as shown in Figs. 1 and 8, upon one of the bearings $f$ and projecting at its upper end into the path of a lug $g^6$ on the periphery or rim of one of the chucks when the latter is elevated with its carrying-frame H into its upper position, as shown in Fig. 1.

$g^7$ is a screw for adjusting the upper end of the stop $g^5$ toward and from the rim of the adjacent chuck, as shown in Fig. 1.

K is a weighted gage-stop mounted so as to turn upon an arm or shaft $a$, supported above and parallel with the saw-arbor and axis of the chucks by a bracket or standard $a'$, rising from the top of the frame. It has an arm $k$, which is capable of being swung into and out of the path of the advancing end of the dowel-pin or other blank held by the chucks G G, as indicated by the dotted lines in Fig. 7.

$a^2$ is a guide adjustably mounted upon the shaft or rod $a$, so as to retain the gage-stop K in its proper position and hold the arm $k$ normally when disengaged in the path of the blank. $l$ is a trip-arm adapted to engage with an arm $k'$ of said gage-stop, and mounted upon a rock-shaft L, supported at the top of the frame parallel with the saw-arbor, and provided with an arm $l'$, which projects underneath the movable end of the vertically-swinging chuck-frame H.

$m$ is a detent carried by an arm $a^3$ on shaft $a$, and projecting normally into the path of an arm $k^2$, formed or connected with the arm $k$ of the gage-stop, so as to hold the latter out of range with a blank held in the chucks G. $m'$ is a trip connected with said detent and located in line with the chucks G when they are in or near their upper position. A spring $m^2$ tends to thrust and hold said detent and trip toward the chucks. The arm $a^3$, with the detent and associated trip carried thereby, is, like the gage-stop K and its guide $a^2$, adjustable lengthwise of the shaft $a$, for the purpose of setting the machine to cut sections of different lengths.

$n$ is a flanged belt-tightening pulley carried by the arm $n'$ of a rock-shaft N, located at the base of the machine, and provided with a lever $n^2$ and a weighted arm $n^3$, which tends to carry and hold the pulley $n$ against the belt connecting the pulleys $d'$ and $e$.

O is an inclined chute located on one side of the machine below the axis of the chucks, and behind the rear chuck, so as to catch the sections as they are severed and ejected.

Our improved machine operates as follows: The chucks being furnished with jaws $g$ and $g'$ of the required size and shape to hold cylindrical blanks of the size to be operated upon, and the gage-stop K, the detent $m$, and trip $m'$ being adjusted upon the arm or shaft $a$ to cut the blanks into sections of the desired length, the machine is set in motion and the blanks are fed manually by an operator into and through the rotating chucks G G against the arm $k$ of the gage-stop K when said chucks are in their upper position with their axis above the periphery of the saw. With each revolution of the cam $i$ the frame H is swung downwardly, carrying the slowly-rotated chucks G G and the blank held therein across the periphery of the saw, which severs it, and into contact with the pointing-cutters, which simultaneously point or bevel the severed ends, which are held and rotated independently by the two chucks on opposite sides of said cutters. The driving mechanism, hereinbefore explained, is constructed and arranged to produce two revolutions of the chucks during their descent with the vibrating frame H. By this means sufficient time and opportunity are given the pointing-cutters to complete the bevel on the opposing ends of the severed blank. As the frame H descends it engages the arm $l'$ and throws the arm $l$ against the arm $k'$ of the gage-stop, thereby moving its arm $k$ out of range with the blank, as indicated by dotted lines in Fig. 7. As said arm $k$ passes the detent $m$ the latter is forced in front of it by the spring $m^2$ and holds it in the position shown by full lines in Fig. 7 until it is released, as hereinafter explained. When the chucks rise, carrying the severed blank out of range with the saw and cutters, the outer end of the blank is thrust by the operator through the chucks carrying the severed section against the trip $m'$, which moves the detent $m$ out of engagement with the arm $k^2$, thereby releasing the gage-stop. The arm $k$ being thus released is carried by the weight against the severed section of the blank and ejects it from the chuck into the discharge-chute O. At the same time it is returned into the path of and intercepts the advancing end of the unsevered portion of the blank at the proper point. When the chucks descend with the frame H, the lug $g^6$ is carried out of engagement with the stop $g^5$ and the chucks are rotated by the connections hereinbefore described, and when they are returned to their upper position said lug is engaged by said stop-arm and their rotary movement is arrested, the belt connecting the pulleys $e'$ and $f'$ slipping, while said chucks remain at rest.

Various changes in the details of the machine may be made within the intended scope of our invention.

We claim—

1. In a cut-off and pointing machine the combination of a saw, two pointing-cutters on opposite sides thereof with cutting edges oblique to the axis of the saw, two rotary chucks on opposite sides of the plane of the saw, each composed of two semicylindrical jaws one of which is capable of yielding away from the other, the axis of said jaws being parallel with and movable toward and from the axis of the saw and cutters, a laterally-movable stop for gaging the length of the sections to be cut standing normally in the path of the blank, and an automatic trip constituting a part of the machine and adapted to move said stop out of the path of the blank at the proper times, substantially as and for the purposes set forth.

2. In a cut-off and pointing machine the combination of a saw, two pointing-cutters on opposite sides thereof, two rotary chucks in line with each other and on opposite sides of the saw and pointing-cutters movable toward and from said saw and cutters, a stop for gaging the length of the sections to be cut standing normally in the path of the blank, and a trip operated by the movable chuck-frame to automatically move said stop out of the path of the blank at the proper time, substantially as and for the purposes set forth.

3. In a cut-off and pointing machine the combination of a saw and a pair of pointing-cutters mounted on opposite sides thereof upon the same arbor and having cutting edges inclined to its faces and a short distance inside of the edge of the saw, means of holding a blank in position to be operated upon by said saw and cutters, a laterally-movable gage-stop standing normally in the path of the blank, means for automatically moving said stop out of the path of the blank, a detent for holding said stop out of the path of the blank and a trip in the path of the blank arranged to disengage said detent from said stop, substantially as and for the purposes set forth.

4. In a cut-off and pointing machine the combination of a saw and pair of pointing-cutters mounted upon the same arbor on opposite sides of the saw, a pair of rotary chucks located on opposite sides of the plane of the saw and movable toward and from its axis, a swinging gage-stop movable transversely to the axis of the chucks and adjustable lengthwise upon an arm parallel with the axis of the chucks, a guide engaging said stop also adjustable lengthwise upon said arm, a detent for holding said stop out of the path of the blank, and a trip in the path of the blank for disengaging said detent from the stop, both mounted and adjustable lengthwise upon said arm, and a rock-shaft having an arm projecting into the path of the chuck-frame, and an arm arranged to engage and move said stop out of the path of the blank when the chuck-frame approaches the saw and cutters, substantially as and for the purposes set forth.

In testimony that we claim the foregoing as our own we affix our signatures in presence of two witnesses.

HENRY H. ROCKWELL.
CHARLES F. GERLACH.
ERNST GEBEL.

Witnesses:
HENRY DEUTSCH,
CHAS. L. GOSS.